C. A. JOHNSON.
APPARATUS FOR REGULATING THE PRESSURE ON A GRINDING STONE.
APPLICATION FILED SEPT. 11, 1912.
1,075,355.
Patented Oct. 14, 1913.
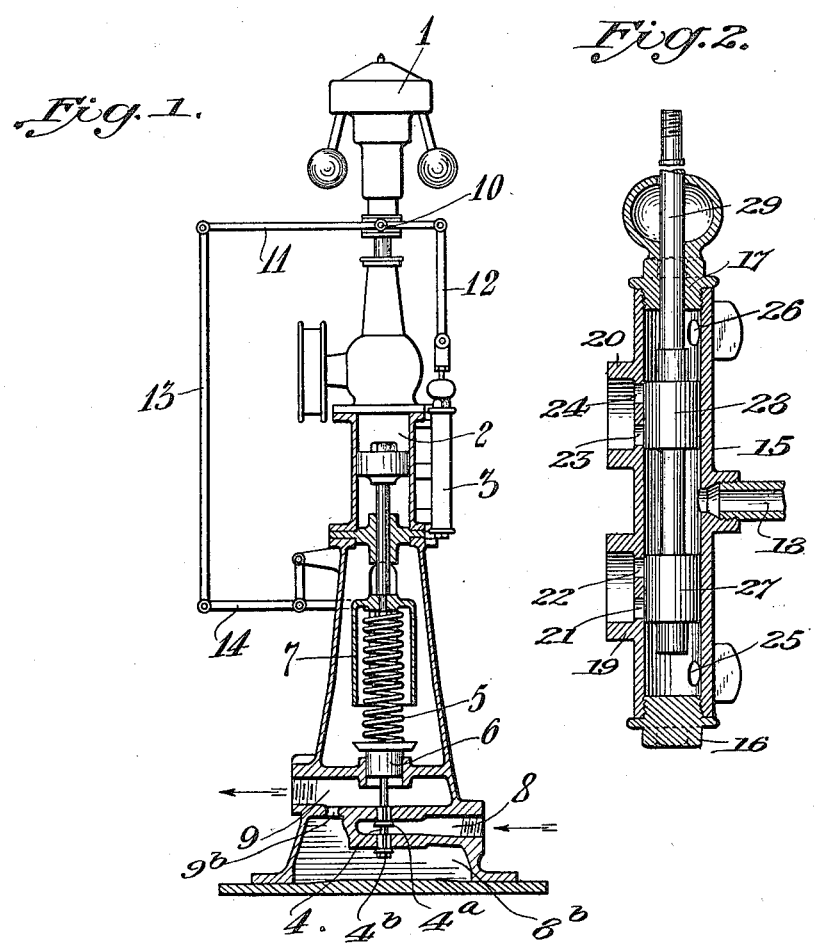

UNITED STATES PATENT OFFICE.

CARL ARVID JOHNSON, OF STOCKHOLM, SWEDEN.

APPARATUS FOR REGULATING THE PRESSURE ON A GRINDING-STONE.

1,075,355.   Specification of Letters Patent.   Patented Oct. 14, 1913.

Application filed September 11, 1912. Serial No. 719,711.

*To all whom it may concern:*

Be it known that I, CARL ARVID JOHNSON, a subject of the King of Sweden, residing at Stockholm, in the Kingdom of Sweden, have invented new and useful Improvements in Apparatus for Regulating the Pressure on a Grinding-Stone or the like, of which the following is a specification, reference being had to the drawing accompanying and forming a part hereof.

My invention relates to improvements in means for regulating the pressure on a grinding stone for instance of the type which is commonly used for grinding wood into pulp. When one, or more than one, of the pressure-cylinders belonging to such a grinding stone is temporarily taken out of service the pressure in the remaining cylinders must be increased in order that a constant speed of rotation of the stone may be maintained. Vice versa an increased number of pressure cylinders requires a decrease in pressure within the cylinders. Several arrangements have been commonly used for the above purpose in which a centrifugal regulator is employed for acting upon a reducing valve in the inlet to the pressure cylinders, the regulator being directly connected to the reducing valve. This direct connection causes the inconvenience that the regulation becomes uneven and not sufficiently sensitive, since the pressure must necessarily vary so much that the speed of the grinding stone shall change enough to cause the regulator to act and to change the position of the valve.

The object of my invention is to obviate this inconvenience and to accomplish a regulator which shall be quick acting and sensitive, reliable and efficient in its operation, and simple of construction.

To gain this object my invention consists mainly in the combination of a reducing valve, a centrifugal speed regulator connected thereto, a hydraulic cylinder having a piston, a pilot valve for the cylinder, a connection between the regulator and the pilot valve, and a connection between the piston and the reducing valve, all arranged for joint operation so that the reducing valve may act independently of the position of the regulator. The regulator does not need to act for small variations in the pressure caused by an increased consumption of water, for the reducing valve itself will act so as to increase the pressure to the degree required. In this way a very much more sensitive regulation will be obtained than by the arrangements previously known.

My invention is illustrated in the accompanying drawings, in which—

Figure 1 shows partly in elevation and partly in vertical section a regulator for the purpose above mentioned comprising the reducing valve, the centrifugal regulator, the cylinder, piston and other associated parts. Fig. 2 shows a vertical section through the pilot valve.

Referring to the drawing 1 represents the centrifugal regulator, 2 the cylinder with its piston, 3 the pilot valve and 4 the reducing valve. The reducing valve is acted upon in customary manner by the spring 5, the lower end of which is attached to the piston 6 while its upper end is placed within the cap 7 which is fastened to the rod of the piston 2. The conduit 8 and the valve 3 are connected to the accumulator used for the pressure cylinders, and the conduit 9 is connected with said cylinders.

As shown in Fig. 2, the pilot valve consists of a cylindrical casing 15 closed at both ends by means of screw plugs 16 and 17, respectively. Through a pipe 18 the interior of the casing is connected with the accumulator and through short pipes 19 and 20 as well as corresponding openings 21, 22 and 23, 24 formed in the wall of the casing 15, with the cylinder-chambers above and below the piston 2, respectively. Besides, the casing 15 is provided with outlets 25 and 26 arranged near to the ends of the casing. The casing 15 contains two pistons 27 and 28 rigidly connected to each other and so arranged that the piston 27, when moving, opens a connection either between the inlet pipe 18 and the space below the piston 2 through opening 22 and pipe 19, or between the said space and the outlet 25 through pipe 19 and opening 21. Likewise, the piston 28, when moving, opens a connection either between the inlet pipe 18 and the space above the piston 2 through opening 23 and pipe 20, or between said space and the outlet 26 through pipe 20 and opening 24. The valve pistons 27 and 28 are connected to the piston rod 29 extending out of the casing 15 through the screw plug 17.

The reducing valve 4 is a balanced double-seat valve, one valve-body 4ᵃ of which has its seat in the bottom of conduit 9, while the other valve-body 4ᵇ has its seat in the bottom of conduit 8. Thus, when the reducing valve 4 is opened, the conduit 8 is connected with conduit 9 past the valve-body 4ª as well as past the valve-body 4ᵇ through the chamber 8ᵇ beneath conduit 8 and the opening 9ᵇ in the bottom of conduit 9.

The above described apparatus operates in the following manner: When the frictional resistance upon the grinding stone is decreased—for instance by putting one of the pressure cylinders out of service for the purpose of supplying more wood—the speed of the stone is increased. The centrifugal regulator, driven from the grinding stone through suitable gearing will then become lifted and thus lift the pistons of the pilot valve 3. Water under pressure will then enter above the piston 2, move it downward and compress the spring 5. Hence the reducing valve 4 is opened so that water under pressure enters from 8 to 9 and increases the pressure in 9 correspondingly to the increased load upon the spring 5. Consequently the wood in the boxes of the pressure cylinders which remain in service will become pressed harder against the grinding stone increasing the frictional resistance so that the speed of the stone becomes reduced to normal speed. If on the other hand the frictional resistance on the stone should from any cause be increased so as to lower the speed of the stone the reducing-valve will act in such way that the pressure within 9 will be decreased until the frictional resistances is reduced to normal. Should a small reduction of pressure occur in the conduit 9—for instance by reason of increased consumption of water—the spring 5 of the reducing valve will itself cause the necessary increase in the pressure without help of the regulator. For the spring 5 will then overbalance the reduced pressure below the piston 6 and open the reducing valve somewhat until balance is again established.

In order to prevent hunting of the regulator, its sleeve 10 is combined with the pistons of the pilot valve by means of a system of levers and links so arranged that the said pistons are restored to normal position independently of the regulator when the piston 2 traverses a certain distance. The lever 11 fulcrumed on the sleeve 10 is connected to the piston rod 29 by means of the link 12 and is also connected through the link 13 to the lever 14 which is combined with the cap 7. If now, for instance, the sleeve 10 moves upward and thus, as before described, causes the piston 2 and the cap 7 to move downward, the lever 11 acted upon by the lever 14 will swing in a clockwise direction until the pistons of the valve 3 are restored to their normal position, and further movement of the piston 2 is stopped. The connections between the centrifugal regulator, the piston 2 with its pilot valve, and the reducing valve can of course be constructed in many other manners than those shown in the drawing without departing from the scope and spirit of the invention.

Having thus described my invention, what I claim is:

1. In an apparatus for regulating the pressure on a grinding stone the combination of a reducing valve, a centrifugal speed regulator connected thereto, a hydraulic cylinder having a piston, a pilot valve for the cylinder, an operative connection between the regulator and the pilot valve, and an operative connection between the piston and the reducing valve, all arranged for joint operation so that the reducing valve may act independently of the regulator.

2. In an apparatus for regulating the pressure on a grinding stone the combination of a reducing valve, a centrifugal speed regulator connected thereto, a hydraulic cylinder having a piston, a pilot valve for the cylinder, links and levers connecting the regulator with the pilot valve and with the piston, and a springy connection between the piston and the reducing valve, all so arranged that a motion of the piston will restore the pilot valve to a normal position independently of the regulator.

CARL ARVID JOHNSON.

Witnesses:
 FREDR. NORDSJÖ,
 K. E. WIBERG.

---

Copies of this patent may be obtained for five cents each, by addressing the "Commissioner of Patents, Washington, D. C."